United States Patent
Wietschorke

(10) Patent No.: US 11,796,838 B2
(45) Date of Patent: Oct. 24, 2023

(54) COMPUTER IMPLEMENTED METHOD OF DETERMINING A NUMERICAL REPRESENTATION OF A SPECTACLE LENS

(71) Applicant: Carl Zeiss Vision International GmbH, Aalen (DE)

(72) Inventor: Helmut Wietschorke, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/187,073

(22) Filed: Mar. 21, 2023

(65) Prior Publication Data

US 2023/0229019 A1     Jul. 20, 2023

Related U.S. Application Data

(63) Continuation of application No. PCT/EP2021/076166, filed on Sep. 23, 2021.

(51) Int. Cl.
*G02C 7/02*     (2006.01)

(52) U.S. Cl.
CPC ............. *G02C 7/028* (2013.01); *G02C 7/027* (2013.01)

(58) Field of Classification Search
CPC ........ G02C 7/024; G02C 7/025; G02C 7/027; G02C 7/028; A61B 3/0091; A61B 3/10;
(Continued)

(56) References Cited

U.S. PATENT DOCUMENTS

| 6,089,713 A | 7/2000 | Hof et al. |
| 6,382,789 B1 | 5/2002 | Baudart et al. |

(Continued)

FOREIGN PATENT DOCUMENTS

| CN | 103513444 A | 1/2014 |
| CN | 105765446 A | 7/2016 |

(Continued)

OTHER PUBLICATIONS

G. Fry et al., "The center of rotation of the eye," American Journal of Optometry and Archives of American Academy of Optometry, vol. 39, No. 11, pp. 581-595, Nov. 1962.

(Continued)

*Primary Examiner* — Travis S Fissel
(74) *Attorney, Agent, or Firm* — Tautz & Schuhmacher LLC; Georg M. Hasselmann

(57) ABSTRACT

A computer implemented method of determining a numerical representation of a spectacle lens is provided, in which a numerically represented working spectacle lens is optimized by ray tracing using pencils of rays along different viewing directions of an eye to obtain an optimized numerical representation. The principal rays of the pencils of rays each pass different ray passing points forming points of a vertex surface. The principal rays extend along a viewing direction related to the respective ray passing point. The locations of the ray passing points are determined by surface points of a non-spherical apex surface representing the locations of the apex of the cornea when the eye rotates. A fixed distance is added to the apex surface at the respective surface points in a direction that corresponds to the viewing direction of the eye when the apex of the cornea is located at that surface point.

16 Claims, 7 Drawing Sheets

(58) Field of Classification Search
CPC ... A61B 3/1005; A61B 3/1015; A61B 3/1025; A61B 3/103; A61B 3/107; A61B 3/113
USPC .............. 351/178, 159.73–159.77, 219–221, 351/211–215, 205–207
See application file for complete search history.

(56) References Cited

U.S. PATENT DOCUMENTS

| | | | |
|---|---|---|---|
| 2003/0174278 A1 | 9/2003 | Esser et al. | |
| 2013/0314666 A1 | 11/2013 | Wietschorke | |
| 2014/0354948 A1* | 12/2014 | Kratzer | G02C 13/005 351/204 |
| 2016/0306191 A1 | 10/2016 | Marin et al. | |
| 2017/0299890 A1 | 10/2017 | Hernandez-Castaneda et al. | |
| 2017/0363883 A1 | 12/2017 | Fricker et al. | |
| 2018/0307058 A1 | 10/2018 | Welscher et al. | |
| 2018/0307059 A1 | 10/2018 | Rousseau et al. | |
| 2019/0171035 A1* | 6/2019 | Spratt | G02C 7/061 |
| 2020/0050020 A1 | 2/2020 | Welscher et al. | |

FOREIGN PATENT DOCUMENTS

| | | |
|---|---|---|
| CN | 106716231 A | 5/2017 |
| CN | 107003540 A | 8/2017 |
| CN | 108139604 A | 6/2018 |
| CN | 110520787 A | 11/2019 |
| DE | 102017118219 A1 | 2/2019 |
| DE | 102017118721 A1 | 2/2019 |
| EP | 0857993 A2 | 8/1998 |
| EP | 1744203 A1 | 1/2007 |
| JP | 2019144277 A | 8/2019 |
| WO | 2018015154 A1 | 1/2018 |

OTHER PUBLICATIONS

K. Schreiber, "Erstellung und Optimierung von Algorithmen zur Messung von Augenbewegungen mittels Video-Okulographie-Methoden" ("Creation and optimization of algorithms for measuring eye movements using video oculography methods"), dissertation, Jan. 22, 1999.

H. Goersch, "Wörterbuch der Optometrie," p. 26, Heidelberg, Germany, 2004, translation of relevant parts attached.

M. Jalie, "The role of the eye's centre of rotation in lens design," Points de Vue, International Review of Ophthalmic Optics, pp. 1-4, Oct. 2013.

Industrial Norm "Ophthalmic optics—Spectacle lenses—Vocabulary (ISO 13666:2019)", German and English version EN ISO ISO 13666:2019, Dec. 2019.

European Search Report issued in EP 20 198 266.7, to which this application claims priority, dated Apr. 6, 2021.

International Search Report and Written Opinion issued in PCT/EP2021/076166, to which this application claims priority, dated Feb. 11, 2022.

International Preliminary Report on Patentability issued in PCT/EP2021/076166, to which this application claims priority, completed Dec. 12, 2022.

Office Action by the Chinese Patent Office (SIPO) issued in CN 202180065182.9, which is a counterpart hereof, dated Jul. 14, 2023, and English translation thereof.

* cited by examiner

COMPUTER IMPLEMENTED METHOD OF
DETERMINING A NUMERICAL
REPRESENTATION OF A SPECTACLE LENS

CROSS REFERENCE TO RELATED
APPLICATIONS

This application is a continuation application of international patent application PCT/EP2021/076166, filed on Sep. 23, 2021 and designating the U.S., which claims priority to European patent application EP 20 198 266.7, filed on Sep. 25, 2020, both of which are hereby incorporated by reference in their entireties.

TECHNICAL FIELD

The present disclosure relates to a computer implemented method of determining a numerical representation of a spectacle lens as well as to a data processing system for determining a numerical representation of a spectacle lens, a computer program for determining a numerical representation of a spectacle lens, and a non-volatile computer readable storage medium. In addition, the disclosure relates to a method of manufacturing a spectacle lens.

BACKGROUND

Unlike many other optical devices as, for example, cameras, telescopes, microscopes, etc., spectacle lenses are individualized optical devices designed for providing clear view in different viewing directions, which means that a desired power of the spectacle lens needs to be achieved for pencils of rays passing the spectacle lens in different directions. In addition, spectacle lenses may be multifocal lenses such as, bifocal lenses, trifocal lenses, or progressive addition lenses (PALs), which means that different prescription powers need to be achieved in different viewing directions.

Today, an individualized spectacle lens is typically produced by use of CNC-process based on a numerical representation of the individualized spectacle lens. Such a numerical representation of a spectacle lens is determined by a numerical optimization process in which at least one surface of a numerically represented working spectacle lens is optimized, such that a prescribed power is achieved for a number of viewing directions and, at the same time, a distribution of properties of the spectacle lens corresponding to a distribution defined by a target design is reached. The distribution of properties may, for example, be a distribution of a residual error of spherical power or a distribution of a residual error of astigmatic power in different viewing directions. This residual error represents a deviation of the respective power realized with the optimized spectacle lens from the desired power when viewing through the spectacle lens in its as-worn position. Alternatively, the distribution of properties may represent a surface power or a surface astigmatism of the optimized spectacle lens surface. Methods of optimizing spectacle lenses are described in U.S. Pat. No. 6,382,789 B1, EP 1 744 203 A1, EP 0 857 993 A2, DE 10 2017 118 721 A1 and DE 10 2017 118 219 A1, for example.

Jalie, M., describes in "The role of the eye's centre of rotation in lens design," Points de Vue, International Review of Ophthalmic Optics, N69, Autumn 2013, the importance of the knowledge of the position of the eye's center of rotation with respect to the spectacle lens when designing a spectacle lens. He reasons that when the eye rotates behind a spectacle lens, away from the optical axis, the distance from the apex of the cornea to the back surface of the spectacle lens increases and, thus, in order to be able to compare the off-axis effects of different forms of spectacle lenses it is necessary to set up a reference surface at which the off-axis powers can be measured. This reference surface, which is concentric with the eye's center of rotation, is called the vertex sphere which just touches the back vertex of the spectacle lens. The vertex sphere is an imaginary spherical surface centered at the eye's center of rotation, the radius of which is called the center of rotation distance which is the sum of the distance of the center of rotation from the apex of the cornea and the vertex distance. Jalie suggests measuring the position of the eye's center of rotation instead of estimating it to improve the designing of spectacle lenses.

G. Fry and W. W. Hill describe in "The center of rotation of the eye" in American Journal of Optometry and Archives of American Journal of Optometry, Vol. 39, No. 11, November 1962 a device that is designed to trace the path pursued by a point at the pole of the cornea as the eye rotates and to locate the successive positions of the primary line of sight.

In the process of optimizing the working spectacle lens, a numerical optimization is done for a number of pencils of rays each passing along the visual axis that extends from a fixation point through the spectacle lens, the pupil, and the pivot point of the eye, where each pencil of rays extends along different viewing direction. The viewing directions are given by the principal rays of the pencils of rays where the principal rays run from the center of a sphere (=pivot point of the eye) through a point on the sphere to the rear surface of the spectacle lens. Hence, each point on the sphere represents a different viewing direction. The sphere has a radius that corresponds to the distance between the pivot point of the eye and the rear surface of the spectacle lens along the viewing direction of the eye with the eye in primary position. A corresponding method of optimizing a spectacle lens is described in U.S. Pat. No. 6,382,789 B1. Although this way of proceeding allows for good results for the primary direction, i.e. the viewing direction with the eye in primary position, or for viewing directions close to the primary direction the results deteriorate with increasing deviation of the viewing direction from the primary direction. However, larger deviations from the primary direction are necessary in multifocal spectacle lenses, for example, when viewing through the near vision zone of a progressive addition lens.

SUMMARY

It is, therefore, a first objective of the present disclosure to provide a computer implemented method of determining a numerical representation of a spectacle lens which shows improved results with increasing deviation of the actual viewing direction from the primary direction. It is a second objective of the present disclosure to provide an advantageous single vision spectacle lens, and it is a third objective of the present disclosure to provide an advantageous method of manufacturing a spectacle lens.

The first objective is achieved by a computer implemented method of determining a numerical representation of a spectacle lens, a computer program for determining a numerical representation of a spectacle lens, a non-volatile computer readable storage medium with program code comprising instructions for determining a numerical representation of a spectacle lens, a data processing system for determining a numerical representation of a spectacle lens, and a non-volatile computer readable storage medium with a numerical representation of a spectacle lens, wherein three-dimensional locations of pencil of ray passing points are determined by surface points of a non-spherical apex surface representing the locations of the apex of the cornea when the eye rotates.

The second objective is achieved by a single vision spectacle lens with a pure spherical prescription that shows axial symmetry about a horizontal symmetry axis and axial symmetry about a vertical symmetry axis without showing rotational symmetry, and the third objective by a method of manufacturing a spectacle lens in which a piece of optical material is machined based on a numerical representation of a spectacle lens determined by surface points of a non-spherical apex surface representing the locations of the apex of the cornea when the eye rotates. Exemplary embodiments of the disclosure are discussed below.

Throughout the present disclosure, the following definitions apply:

The term "back focal length" is used to indicate a distance between a ray passing point on a surface and a focal point or a focal line along a principal ray. In the present specification the term "back focal length" is used to indicate a distance between a ray passing point of the vertex surface and a focal point or line along a principal ray.

The term "power" refers to the capacity of a lens or optical surface to change the curvature or direction of incident wave fronts by refraction (see DIN EN ISO 13666:2019, section 3.1.10).

The term "dioptric power" is a general term encompassing the "focal power" and the "prismatic power" (see DIN EN ISO 13666:2019, section 3.10.3), where the term "focal power" encompasses the "spherical vertex power" and the "astigmatic vertex power" of a spectacle lens (DIN EN ISO 13666:2019, section 3.10.2). In the present specification all vertex powers are back vertex powers which are given by the reciprocal of the paraxial back focal length measured in meters.

The term "progressive-addition lens" refers to a spectacle lens with variable power and two reference points for focal power, usually designed for providing a correction for presbyopia and clear vision from distance vision to near vision (see DIN ISO 13666:2019, section 3.7.8). A progressive-addition lens includes a near vision zone and a distance vision zone where the terms "near vision zone" and "distance vision zone" refer to that portion of the progressive-addition lens having the power for near vision and that portion of a progressive-addition lens having the power for distance vision, respectively. The difference between the near power and the distance power experienced by the wearer is called addition power. In a progressive-addition lens there is a progression zone between the near vision zone and the distance vision zone in which the power experienced by the wearer progresses continuously from the power for distance vision to the power for near vision and in which the vision for the wearer is clear. The length of the progression zone is called progression length.

The term "distance design reference point" refers to that point stipulated by the manufacturer, on the front surface of a finished spectacle lens or on the finished surface of a lens blank, at which the design specification for the distance vision zone apply (see DIN EN ISO 13666:2019, section 3.2.17).

The term "near design reference point" refers to that point stipulated by the manufacturer, on the front surface of a finished spectacle lens or on the finished surface of a lens blank, at which the design specification for the near vision zone apply (see DIN EN ISO 13666:2019, section 3.2.18).

The term "lens blank" refers to a piece of optical material with one optically finished surface for the making of a lens (see DIN EN ISO 13666:2019, section 3.8.1)

The term "prescription data" or "individual prescription data" is used as generic term for a set of optical characteristics of the spectacle lens, such as, e.g., dioptric power, addition power, refractive index, and progression length, according to a prescription.

The term "freeform surface" refers to a surface which may freely be formed during the manufacturing process and which does not need to show axial symmetry or rotational symmetry. In particular, a freeform surface may lead to different powers in different sections of the surface. The use of freeform surfaces allows for improving the quality of spectacle lenses with regard to imaging quality experienced by the wearer, as the spectacle lens can be optimized with respect to individual prescription values of the wearer, as well as to individual centration and frame data. Freeform surfaces of progressive power lenses include a larger number of parameters, which may be taken into account in the calculation of the surface than in the calculation of the freeform surfaces for single vision lenses, e.g. the progression length or the addition power.

The term "target design" describes a specification of the properties of a spectacle lens and/or of a surface of the spectacle lens. The properties may in particular but not exclusively include the distribution of power of the spectacle lens, distributions of optical aberrations in the beam path running through a spectacle lens, through the pupil and through the eye's center of rotation, and/or distributions of surface properties over a surface of the spectacle lens and/or targets and limits for the refractive index distribution and/or targets and limits for the derivatives of the refractive index distribution of the lens material.

The term "visual axis" (British English) or "line of sight" (US English) refers to a beam path from a fixation point in object space to the center of the entrance pupil of the eye and its continuation in image space from the center of the entrance pupil to the fixation space on the retina, which is typically the fovea centralis (see DIN EN ISO 13666:2019, section 3.2.24).

The term "primary direction" refers to the direction of the visual axis, usually taken to be the horizontal, to an object at an infinite distance measured with habitual head and body posture when looking straight ahead in unaided vision (see DIN EN ISO 13666:2019, section 3.2.25)

The term "primary position" refers to the position of the eye when viewing in primary direction (see DIN EN ISO 13666:2019, section 3.2.26).

The term "as-worn position" refers to a position and orientation of the spectacle lens relative to the eyes and face during wear (see DIN EN ISO 13666:2019, section 3.2.36) and includes at least values for the vertex distance, the face form angle and the as-worn pantoscopic angle.

The term "vertex distance" refers to the horizontal distance between the rear surface of the spectacle lens and the apex of the cornea as measured with the eye in primary position (see DIN EN ISO 13666:2019, section 3.2.40).

The "face form angle" is an angle between the plane of the spectacle front and the right plane of the lens shape or of the left plane of the lens shape, where the plane of the spectacle front is a plane that contains the vertical centerlines of the right and left boxed lens shapes, the plane of the lens shape is a plane that contains the vertical centerline and is parallel to the horizontal centerline of the individual lens, and where the lens shape is the outline of the edged lens periphery in its intended orientation (see DIN EN ISO 13666:2019, section 3.2.39).

The "as-worn pantoscopic angle" refers to a vertical angle formed between the horizontal and a line perpendicular to a reference line that runs through the base of the notch in the upper and lower rim of the frame and lies in a vertical plane including the primary direction (see DIN EN ISO 13666: 2019, section 3.2.37).

The term "pencil of rays" is used to indicate a geometric construct used to describe a beam or portion of a light beam as a narrow cone or cylinder formed by a number of rays. The diameter of the pencil of rays is defined by the pupil diameter, which affects the optical power calculation of the pencil of rays.

The term "principal ray" is used in the context of a pencil of rays to indicate a ray of the pencil of rays that forms in any section through the pencil of rays that is perpendicular to the respective ray at the geometrical center of that section.

The term "ray tracing" is used to indicate a method of calculating the paths of rays of a pencil of rays taking into account refractive and/or reflective surfaces encountered by the pencil of rays.

The term "numerical representation of a spectacle lens" is used to indicate a computer readable data set representing a spectacle lens.

The term "working spectacle lens" is used to indicate a spectacle lens given in form of a numerical representation with at least one parameterized surface that is to be optimized in an optimization process and/or at least one refractive index distribution of the lens material that is to be optimized in an optimization process.

The term "ray passing point" is used to indicate a point of a surface which is passed by a ray of a pencil of rays.

The term "apex surface" is used to indicate a surface on which the apex of the cornea moves when the eye rotates.

The term "vertex surface" is used to indicate a surface that is constructed by adding to each point of an apex surface the vertex distance in a defined direction with respect to the surface normal of the apex surface. Based on this vertex surface the back focal length for the wearer can be calculated for each viewing direction of the eye respectively for each ray path of the principal ray by the distance of the ray passing point through the vertex surface to the focal point or focal line of the pencil of rays along the principal ray.

The term "viewing direction" refers to the direction into which an eye gazes. The viewing direction may be given by the direction along the visual axis of an eye.

The term "toroidal" is used in the context of a surface to indicate a surface that is a section of the surface of a torus.

The term "ellipsoid" is used in the context of a surface to indicate a surface that fulfills in Cartesian coordinates the following equation $x^2/a^2+y^2/b^2+z^2/c^2=1$ where a, b, c>1 and the case a=b=c is excluded.

The term "azimuth angle" is used throughout the specification to indicate an angle between a radial line in a plane perpendicular to the normal vector of a surface and a fixed radial reference line within the plane. Throughout the present specification the orientation of the fixed radial line relative to the normal vector shall be constant, i.e. when the orientation of the normal vector at the apex of the cornea changes in three-dimensional space due to a change in the viewing direction the orientation of the fixed radial line changes in the same manner, where a rotation of the fixed radial line about the normal vector only takes place by the amount in which the eye rotates about the normal vector at the apex of the cornea when the viewing direction is changed. So the rotation of the fixed radial line can be realized according to the rotation of the eye as it is described in Listing's law. However, if the rotation of the eye about the normal vector at the apex of the cornea which comes along with a change in the viewing direction is small the rotation of the fixed radial line about the normal vector may be neglected.

The term "polar angle" is used throughout the specification to indicate an angle between a direction and the normal direction.

The term "defined angle" is used throughout the specification to indicate that is either a fixed angle or an angle determined by a functional dependency on at least one variable. In this sense, a defined azimuth angle and the defined polar angle are either fixed angles or determined by a functional dependency of the azimuth angle and the polar angle on at least one variable.

The term "conventional center of rotation requirement" defines the position of the lens before the eye, so that the optical axis of the eye goes through the optical center of rotation of the eye," see Helmut Goersch, "Wörterbuch der Optometrie," DOZ-Verlag, 3. Edition 2004, Heidelberg.

The term "axial symmetry" stands for symmetry around an axis. An object is axially symmetric if its appearance is unchanged if rotated around an axis. Axial symmetry can be discrete which means that an n-fold symmetry is present. In case of n=2 an object is symmetric by a rotation of 180° about the axis.

In the computer implemented method of determining a numerical representation of a spectacle lens a numerically represented working spectacle lens is optimized by means of an optimization process and ray tracing using a number of pencils of rays along different viewing directions of an eye, for example as given by respective different directions of the visual axis of the eye, in order to obtain an optimized numerically represented working spectacle lens. In the optimization process at least one lens surface of the working spectacle lens may be optimized. In addition to, or as an alternative to, optimizing at least one lens surface of the working spectacle lens the distribution of the refractive index of the working spectacle lens may be optimized. The optimized working spectacle lens then constitutes the numerical representation of the spectacle lens to be determined. The number of the pencils of rays used for the ray tracing is at least two and typically considerably higher than two, for example a two-digit or three-digit number.

The principal rays of the pencils of rays each pass different ray passing points which form points of a vertex surface. Each principal ray extends along a viewing direction related to the respective ray passing point. The three-dimensional locations of the ray passing points are determined by surface points of a non-spherical apex surface representing the locations of the apex of the cornea when the eye rotates, and a fixed distance which is added to the apex surface at the respective surface points in a direction that corresponds to the viewing direction of the eye when the apex of the cornea is located at the surface point.

The three-dimensional locations of the ray passing points then form a point cloud that constitutes a representation of the vertex surface which is, according to the present disclosure, a non-spherical vertex surface. Thus, in contrast to the state of the art the locations of the ray passing points determined according to the inventive method do not lie on a spherical vertex surface but on a non-spherical vertex surface which allows for more precise representation of the actual eye movement than a spherical vertex surface. As a consequence, the ray tracing process can provide more accurate results than a ray tracing process using a spherical vertex surface and, as a consequence the optimized spectacle lens resulting from the optimization process is better adapted to the eye. Moreover, when using ray passing points on a spherical vertex surface the points where the principal rays hit the rear surface of the working spectacle lens differ from the points where the visual axis of the actual viewing direction hits the rear surface of the working spectacle lens. With the ray passing points determined according to the disclosure the points where the principal rays hit the rear surface of the working spectacle lens are shifted as compared to ray passing points on a spherical vertex surface so that they better coincide with the points where the visual axis actually hits the rear surface of the working spectacle lens. This is in particular true for larger deviations from the primary direction. This shift improves the optical quality of the spectacle lens resulting from the optimization.

In case a viewing direction is given in terms of a vector, the corresponding rotational position of the eye can be represented in the optimization process by the coordinates of the principle ray passing point on the vertex surface for which the direction of the principle ray is the viewing direction. Thereby each point of the vertex surface not only unambiguously determines the rotational position of the eye but also the course of the principal ray and, thus, for example the point where the principal ray hits the rear surface of the working spectacle lens.

The viewing direction may be represented by a defined azimuth angle and a defined polar angle with respect to the normal direction of the apex surface. The defined azimuth angle and the defined polar angle may either be fixed angles or the defined azimuth angle and the defined polar angle may be determined by a functional dependency of the azimuth angle and the polar angle on at least one variable. For example, the at least one variable may represent the rotational position of the eye. While a fixed angle simplifies the determination of the three-dimensional locations of the ray passing points a functional relationship may lead to more accurate results. However, the variation of the azimuth angle and the polar angle with rotational positions of the eye is believed to be small so that fixed angles should be sufficient. The defined polar angle may typically lie in or be selected from the range extending from 0 degree to 20 degree, or from greater that 0 to 20 degree, and, more specifically, lie in or be selected from the range extending from 0 degree to 10 degree, or from greater that 0 to 10 degree, or from 0 degree to 5 degree, or from greater that 0 to 20 degree. In particular, the defined polar angle may be 0 degree so that the fixed distance is added in the normal direction of the apex surface. The defined azimuth angle and a defined polar angle with respect to the normal direction of the apex surface can account for a deviation of the viewing direction from the normal direction of the cornea at the apex of the cornea. Typical deviations of the viewing direction from the normal direction of the cornea can be considered by the polar angles in the ranges mentioned above.

The fixed distance that is added to a point of the apex surface to determine the three-dimensional location of a ray passing point may, in particular, be the vertex distance. Then, the vertex surface can replace the spherical surface of the state of the art in the optimization process without necessity of further adaptions of the optimization process.

According to a first advantageous development of the disclosure, the non-spherical apex surface may be a surface which results from the set of locations of the cornea when the eye rotates about a first rotation axis and about a second rotation axis which is not parallel to the first rotation axis where the first rotation axis and the second rotation axis do not intersect. Each ray passing point may then represent a first rotation angle defining a rotation of the eye about the first rotation axis and a second rotation angle defining a rotation of the eye about the second rotation axis. In particular, the first rotation axis may be a horizontal rotation axis about which the eye rotates for changing the vertical viewing direction while the second rotation axis may be a vertical rotation axis about which the eye rotates for changing the horizontal viewing direction. Such an apex surface represents a toroidal surface that is spherical in a section perpendicular to the first rotation axis and spherical in a section perpendicular to the second rotation axis where the radii of the spheres differ by the distance between the first rotation axis and the second rotation axis. The distance between the first rotation axis and the second rotation axis may be in the range from greater than 0 mm up to 7.5 mm. For example, a value may be in the range between 1 and 5 mm or, more specific, in the range between 2 mm and 4 mm. The mentioned ranges, in particular the broader ranges, cover most of the measured distances between the horizontal rotation axis and the vertical rotation axis.

Scientific research has shown that the horizontal rotation axis of the eye and the vertical rotation axis of the eye can have different distances from the apex of the cornea so that they do not intersect. The rotation of the eye is, for example, described in the diploma thesis of Kai Schreiber, "Erstellung and Optimierung von Algorithmen zur Messung von Augenbewegungen mittels Video-Okulographie-Methoden," Tübingen, 22. January 1999. In particular, research results indicate that the average distance between the horizontal rotation axis and the vertical rotation axis is about 3 mm. Usually, the horizontal rotation axis, i.e. the rotation axis about which the eye rotates for changing the vertical viewing direction, is closer to the apex of the cornea than the vertical rotation axis, i.e. the rotation axis about which the eye rotates for changing the horizontal viewing direction. Therefore, due to the fact that for optimizing the working spectacle lens rotations about two axes which are spaced apart from each other are considered, the actual viewing direction of an eye can be represented more precisely by a principle ray passing a point of the vertex surface that is computed by taking into account of these different rotation axis than it is possible with the previous models which rely on a single pivot point.

The distance between the first and second rotation axes of the eye is of importance for correctly determining the power of a spectacle lens which a wearer experiences in the periphery of the spectacle lens when he uses it in the as-worn position. This is, in particular, relevant for the near vision zone of a multifocal lens such as, for example, a progressive addition lens, for which a reduced distance of the horizontal rotation axis from the apex of the cornea as compared to considering only a single pivot point of the eye means that the principal ray of a pencil of rays through the near vision zone runs more obliquely through the near vision zone which leads to an increased residual astigmatic error when viewing through the near vision zone. In addition, with a reduced distance of the horizontal rotation axis from the apex of the cornea in primary position of the eye the distance between the apex of the cornea and the spectacle lens increases for oblique views downwards as compared to considering only a single pivot point of the eye. This in turn leads to an increased mean power provided by the spectacle lens when viewing obliquely down, which is, for example, the case when viewing through the near vision zone or the progressive zone of a progressive addition lens or any other multifocal spectacle lens. Hence, the actual power of an optimized spectacle lens may differ from the power provided in the prescription when the wearer is viewing downwards through the near vision zone or the progressive zone. Moreover, calculations of distortions which are produced by the spectacle lens are influenced by the distance between the horizontal rotation axis and the vertical rotation axis, too. Furthermore, as compared to considering only a single pivot point of the eye, a non-zero distance between the horizontal rotation axis and the vertical rotation axis alters the main visual direction line through the near vision zone and the progressive zone of the spectacle lens, i.e. the locations on the front surface of a progressive addition lens or any other multi focal lens when viewing through the near zone and the progressive zone on objects which lie straight ahead of the wearer. All these factors contribute to reducing the optical quality of the result of the optimization process when optimizing a spectacle lens with using a single pivot point.

Taking into account the distance between the rotation axes about which the eye rotates, therefore, allows for an increased optical quality for the wearer of the results of the optimization process, in particular for the periphery of the optimized spectacle lens, such as for example for the near vision zone of a progressive addition lens. Therefore, with the inventive method of determining a numerical representation of a spectacle lens an improvement of the optimization results can be achieved.

According to a second advantageous development of the disclosure, the non-spherical apex surface may be a surface of an ellipsoid. By such a surface it becomes possible to take into account of a more complex eye rotation without fixed rotation axes. Furthermore, it becomes possible not only to take into account a distance between the first rotation axis and the second rotation axis but also to take into account a distance of the straight continuation of the visual axis in front of the eye in the direction of the retina from the first rotation axis and/or the second rotation axis when viewing in the primary direction. This allows for an even more precise modeling of the eye movement and, therefore, for an even more precise optimization of the working spectacle lens.

According to a third advantageous development of the disclosure the non-spherical apex surface is the result of a measurement. For example, the three-dimensional coordinates of the locations of the apex of the cornea in a number of rotational orientations of the eye may be determined by use of stereoscopic images. The distance of the straight continuation of the visual axis in front of the eye in the direction of the retina from the first rotation axis and/or the second rotation axis may lead to other geometries of the apex surface than the geometries mentioned up to now. Such geometries may be difficult to model. Measuring the apex surface overcomes the necessity of modelling the geometry. In addition, basing the apex surface on measurements allows for providing individualized apex surfaces and for taking into account even more complex eye movements.

According to a second aspect of the disclosure, a computer program for determining a numerical representation of a spectacle lens is provided. The inventive computer program comprises program code with instructions which, when executed by a computer, cause the computer to optimize a numerically represented working spectacle lens by means of an optimization process and ray tracing using a number of pencils of rays along different viewing directions of an eye, for example as given by respective different directions of the visual axis of the eye, in order to obtain an optimized numerically represented working spectacle lens. The optimized working spectacle lens then constitutes the numerical representation of the spectacle lens to be determined. The principal rays of the pencils of rays each pass different ray passing points forming points of a vertex surface and extend along a viewing direction related to the respective ray passing point. The program code includes instructions which, when executed by the computer, cause the computer to determine the three-dimensional locations of the ray passing points by surface points of a non-spherical apex surface representing the locations of the apex of the cornea when the eye rotates, and to add a fixed distance to the apex surface at the respective surface points in a direction that corresponds to the viewing direction of the eye when the apex of the cornea is located at the surface point.

The inventive computer program allows for implementing the inventive computer implemented method on a computer. Further developments of the inventive computer program may comprise program code with instructions which, when executed by a computer, cause the computer to execute the described further developments of the inventive computer implemented method.

According to a third aspect of the disclosure, a non-volatile computer readable storage medium with program codes stored thereon is provided. The program code comprises instructions for determining a numerical representation of a spectacle lens, where the instructions, when executed by a computer, cause the computer to optimize a numerically represented working spectacle lens by means of an optimization process and ray tracing using a number of pencils of rays along different viewing directions of an eye, for example as given by respective different directions of the visual axis of the eye, in order to obtain an optimized working spectacle lens. The optimized numerically represented working spectacle lens then constitutes the numerical presentation of the spectacle lens to be determined. The principal rays of the pencils of rays each pass different ray passing points forming points of a vertex surface and extend along a viewing direction related to the respective ray passing point. According to the disclosure, the program code includes instructions which, when executed by the computer, cause the computer to determine the three-dimensional locations of the ray passing points by surface points of a non-spherical apex surface representing the locations of the apex of the cornea when the eye rotates, and to add a fixed distance to the apex surface at the respective surface points in a direction that corresponds to the viewing direction of the eye when the apex of the cornea is located at that surface point.

The inventive non-volatile computer readable storage medium allows the inventive computer program to be loaded on a computer or any other data processing system so as to bring the computer or the data processing system, respectively, into a configuration which allows to execute the steps of the inventive computer implemented method. Further developments of the inventive non-volatile computer readable storage medium may comprise program code with instructions which, when executed by a computer, cause the computer to execute the described further developments of the inventive computer implemented method.

According to a fourth aspect of the disclosure, a data processing system for determining a numerical representation of a spectacle lens is provided. The data processing system comprises a processor and at least one memory where, by means of instructions of a computer program stored in the memory, the processor is configured to optimize a numerically represented working spectacle lens by means of an optimization process and ray tracing using a number of pencils of rays along different viewing directions of an eye, for example as given by respective different directions of the visual axis of the eye, in order to obtain an optimized numerically represented working spectacle lens. The optimized working spectacle lens then constitutes the numerical representation of the spectacle lens to be determined. The principal rays of the pencils of rays each pass different ray passing points forming points of a vertex surface and extend along a viewing direction related to the respective ray passing point. According to the disclosure, by means of instructions of the computer program stored in the memory, the processor is configured to determine the three-dimensional locations of the ray passing points by surface points of a non-spherical apex surface representing the locations of the apex of the cornea when the eye rotates, and to add a fixed distance to the apex surface at the respective surface points in a direction that corresponds to the viewing direction of the eye when the apex of the cornea is located at that surface point.

The inventive data processing system allows for carrying out the inventive computer implemented method. In further developments of the inventive data processing system the processor may be configured to execute the described further developments of the inventive computer implemented method by means of instructions of a computer program stored in the memory of the data processing system.

According to a fifth aspect of the disclosure, a non-volatile computer readable storage medium with a numerical representation of a spectacle lens obtained by the inventive computer implemented method or its further developments is provided. Such a non-volatile computer readable medium contains a numerical representation of a spectacle lens which exhibits improved viewing properties in particular when viewing through peripheral parts of the spectacle lens such as, for example, the near vision zone of a progressive addition lens.

The inventive computer implemented method may also lead to single vision spectacle lenses for pure spherical prescriptions which shows axial symmetry about a horizontal symmetry axis and axial symmetry about a vertical symmetry axis without showing rotational symmetry. Such a spectacle lens can have a considerably lower residual astigmatic and spherical error than a state of the art single vision lens for a pure spherical prescription. This is, in particular, true for large viewing angles.

According to the disclosure also a method of manufacturing a spectacle lens is provided. In this method, a piece of optical material such as, for example, a lens blank is machined based on a numerical representation of a spectacle lens as determined by the inventive computer implemented method of determining a numerical representation of a spectacle lens so as to form a spectacle lens with a surface as defined by the numerical representation of the spectacle lens. The inventive method of manufacturing a spectacle lens may include the inventive method of determining a numerical representation of a spectacle lens. In this case, the method of manufacturing a spectacle would include the steps of:
  determining a numerical representation of a spectacle lens according to the inventive method of determining a numerical representation of a spectacle lens, and
  forming a spectacle lens with a surface as defined by the determined numerical representation of the spectacle lens.

BRIEF DESCRIPTION OF THE DRAWINGS

Further features, properties, and advantages of the present disclosure will become clear from the following description of exemplary embodiments in conjunction with the accompanying drawings.

DESCRIPTION OF EXEMPLARY EMBODIMENTS

Figure 1:
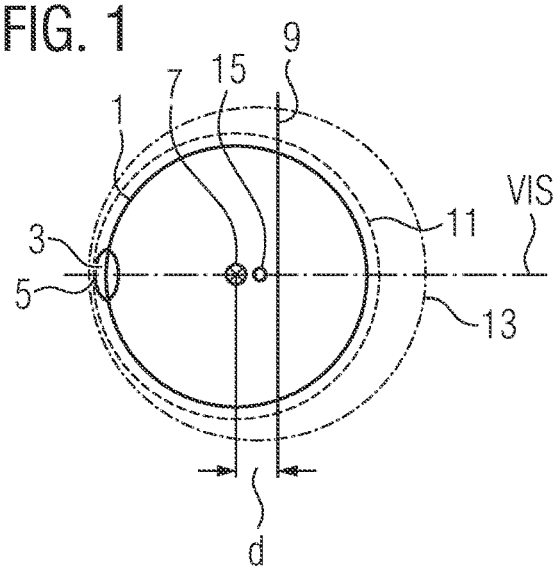
FIG. 1 shows a vertical section through an eye and the apex surface on which the apex of the cornea moves, when the eye rotates.
Figure 2:
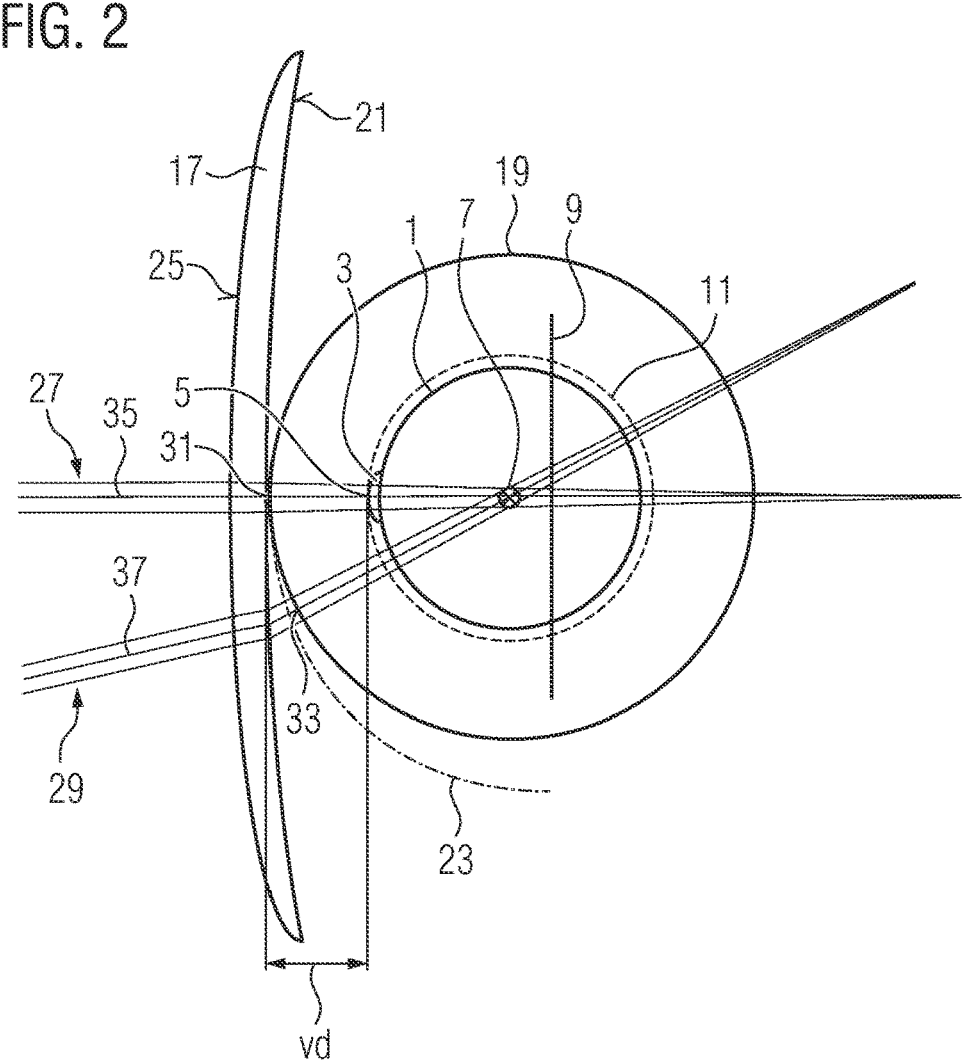
FIG. 2 shows a working spectacle lens and a vertex surface used in the optimization process for optimizing the working spectacle lens according to the inventive method as well as a spherical vertex surface used in a state of the art optimization process.

An exemplary embodiment of the disclosure will be described with respect to FIGS. 1 and 2, in which FIG. 1 shows the apex surface and FIG. 2 shows the resulting vertex surface used in the optimization process. In this exemplary embodiment, a toroidal apex surface is used for constructing the vertex surface that is used in the optimization process for optimizing a working spectacle lens. In addition, FIG. 2 shows the shape of a spherical vertex surface as it is used in the state of the art, i.e. a vertex surface based on only a single pivot point.

The shape of the apex surface which will be used for constructing the vertex surface will now be described with respect to FIG. 1. The FIG. schematically shows an eye 1 with the cornea 3 and the apex 5 of the cornea 3. In the present exemplary embodiment an eye model is used in which the movement of the eye is described by rotations about a horizontal rotation axis 7 and a vertical rotation axis 9. According to this model, when the vertical viewing direction is changed the eye 1 rotates about the horizontal rotation axis 7. On the other hand, when the horizontal viewing direction is changed the eye 1 rotates about a vertical rotation axis 9. The horizontal rotation axis 7 and the vertical rotation axis 9 are spaced from each other by a distance d which represents the smallest distance between the horizontal rotation axis 7 and the vertical rotation axis 9. This distance d has been found to be about 3 mm in average. However, it may also be smaller or larger and may be in the range from greater than zero up to 7.5 mm with most of the distances lying in the range between 2 mm and 4 mm. In the present exemplary embodiment, a distance d used in the eye model is 3 mm.

When the eye 1 rotates the apex 5 of the cornea 3 moves along a surface 11 that is called apex surface throughout this specification. FIG. 1 shows a vertical section through the apex surface 11 with the vertical rotation axis 9 lying within the section. As can be seen from the FIG., the section forms a circle on which the apex 5 of the cornea moves when the vertical viewing direction is changed, i.e. rotated about the horizontal rotation axis 7. The center of the circle is given by the point where the horizontal rotation axis 7 intersects the sectional plane.

When the horizontal viewing direction of the eye 1 is changed the apex 5 of the cornea 3 also moves along a second circle. The center of this second circle is given by the intersection of the vertical rotation axis 9 and a horizontal sectional plane in which the horizontal rotation axis 7 lies. However, as the distance of the vertical rotation axis 9 from the apex 5 of the cornea 3 is larger than the distance of the horizontal rotation axis 7 from the apex 5 of the cornea 3 the radius of the circle in the horizontal section is larger than the radius of the circle in the vertical section.

The apex surface in three dimensions is the surface which results from rotating the circle present in the vertical section about the vertical rotation axis 9 or by rotating the circle present in the horizontal section about the horizontal rotation axis 7. The result of such a rotation is a toroidal surface, i.e. a surface with circular sections in the mentioned horizontal and vertical planes but with different diameters of the respective circles. In other words, due to the distance between the horizontal rotation axis 7 and the vertical rotation axis 9 the apex 5 of the cornea 3 moves along a toroidal apex surface 11 when the eye 1 changes viewing direction. FIG. 1 also shows a spherical surface 13 which resembles an apex surface which would result from treating the eye 1 as rotating horizontally and vertically about a single pivot point 15.

FIG. 1 shows the eye 1 in primary position. As can be seen from FIG. 1, when the viewing direction differs from the primary direction, for example when the eye 1 looks vertically upwards or downwards, there is a deviation of a spherical apex surface 13 as it would result from a single pivot point of the eye 1 from the toroidal apex surface 11 of the present exemplary embodiment. This deviation increases with increasing angle between the viewing direction and the primary direction. As a consequence, while the spherical apex surface 13 represents the location of the apex 5 of the cornea 3 reasonably good for small angles between the viewing direction and the primary direction there is a considerable lack of correlation between the real position of the apex 5 of the cornea 3, which is given by the toroidal apex surface 11, and the position represented by the spherical apex surface 13. This is of importance, for example in case of multifocal spectacle lenses which typically include a near vision zone which, when used, requires a vertically downwards viewing direction. As a consequence, for such near vision zones the spherical apex surface 13 does not represent a correct position of the apex 5 of the cornea 3. In the context of the present disclosure, the viewing direction is represented by a visual axis which, according to the eye model used in the present exemplary embodiment, is assumed to run in normal direction of the surface of the cornea 3 at its apex 5.

FIG. 2 shows a working spectacle lens 17 used in an optimization process for optimizing a spectacle lens. It also shows a section through a vertex surface 19 which contacts the rear surface 21 of the working spectacle lens 17 at a point at which the visual axis passes the working spectacle lens 17 when the eye 1 is in primary position. In the present exemplary embodiment, the vertex surface 19 is constructed by adding to each point of the apex surface 11 the vertex distance vd in normal direction of the apex surface 11. In other words, the vertex distance vd is added to the apex surface 11 in a direction that corresponds, according to the eye model used, to the viewing direction of the eye 1. In practice, the vertex surface 19 may be represented by a point cloud formed by the ray passing points 31, 33 of the vertex surface 19. The three-dimensional locations of these ray passing points 31, 33 are determined by adding to points of the apex surface 11 the vertex distance vd in normal direction of the apex surface 11.

Since the position of the vertex surface 19 is determined by adding the vertex distance vd in normal direction of the apex surface 11 at each point of the apex surface 11 the geometrical shape of the vertex surface 19 corresponds to the geometrical shape of the apex surface 11 so that, like the apex surface 11, the vertex surface 19 is a toroidal surface in the present exemplary embodiment. For comparison, FIG. 2 also shows a section through a vertex surface 23 which results from adding the vertex distance vd in normal direction to each point of the spherical apex surface 13 (as shown in FIG. 1) thus leading to a vertex surface as used in the state of the art.

For optimizing the working spectacle lens 17 the working spectacle lens 17 is numerically represented by a number of parametrized piecewise defined functions. In the present exemplary embodiment, the parametrized piecewise defined functions represent the rear surface 21 of the working spectacle lens 17. The optimization process of the present exemplary embodiment involves an iterative optimization of the parameters of the piecewise defined functions. Although in the present exemplary embodiment the rear surface 21 which is optimized and thus represented by parametrized piecewise defined functions in other embodiments it is also possible to optimize the front surface of the spectacle lens. In this case, the front surface 25 would be represented by a number of parametrized piecewise defined functions. Of course, it is also possible to optimize the working spectacle lens 17 by optimizing the rear surface 21 as well as the front surface 25. In this case, both the rear surface 21 and the front surface 25 would be represented by parametrized piecewise defined functions. Moreover, it would also be possible to optimize the distribution of the refractive index of the lens material that is to optimize the parameters of a parametrized refractive index distribution function instead of, or in addition to, optimizing one or more lens surfaces. The parametrized piecewise defined functions may, in particular, be piecewise defined continuous functions, piecewise defined continuously differentiable function and, typically piecewise defined two times continuously differentiable functions. Examples for parametrized piecewise defined functions are piecewise defined polynomial functions, in particular polynomial splines like bicubic splines or splines of higher grade, polynomial non-uniform rational B-splines (NURBS), etc.

Optimizing the working spectacle lens 17, which, in the present embodiment, means optimizing the rear surface 21, is done by iteratively optimizing the parameters of each parameterized piecewise defined function. In each step of the iteration, the focal length of a pencil of rays emerging from an object with given object distance to the lens and passing through an area of the rear surface 21 represented by the respective piecewise defined function is calculated and the parameters of the piecewise defined functions are iteratively optimized until the calculated focal lengths based on the ray passing points on the vertex surface correspond to focal lengths which result from the prescription values given in the prescription and the target design requests. In the optimization process also the as-worn conditions of the spectacle lens are considered. In case of a progressive addition lenses the object distance varies with the viewing direction (typically from a large object distance in primary position to a short object distance when viewing downwards), and the object distances for the different viewing directions are given by an object model.

FIG. 2 shows two exemplary pencils of rays 27, 29 one of them extending along the primary direction (reference numeral 27) and one extending along a viewing direction which corresponds to viewing vertically downwards (reference numeral 29). The diameters of the pencils of rays 27, 29 are given by the pupil diameter of the eye 1. Each pencil of rays 27, 29 includes a principal ray 35, 37 which coincides with the visual axis for the respective viewing direction. The principal rays 35, 37 of the pencils of rays 27, 29 pass the vertex surface 19 at passing points 31, 33 of the vertex surface 19 and run perpendicular to the vertex surface 19 at the passing points 31, 33, i.e. along the surface normals at the respective ray passing points. The locations of the passing points 31, 33 can be seen as representing the viewing directions which correspond to the principal rays 35, 37 passing through the respective points 31, 33.

As can be seen from FIG. 2, the principal ray 37 of the pencil of rays 29 representing a downward viewing direction runs perpendicular to the vertex surface 19 of the present exemplary embodiment but not to a spherical vertex surface 23 as it would result from only using a single pivot point. On the other hand, a principal ray running perpendicular to the spherical vertex surface 23 at its passing point through the spherical vertex surface 23 would not run perpendicular to the vertex surface 19 of the present exemplary embodiment. However, the normal of a point on the vertex surface 19 of the present exemplary embodiment represents the viewing direction of the eye 1 better than the normal of a point of a spherical vertex surface. Therefore, using the vertex surface 19 of the present exemplary embodiment allows for a more precise calculation of the focal length of a pencil of rays for a certain viewing direction than the spherical vertex surface 23 according to the state of the art does.

Furthermore the focal length values result from the distances of the focal points or lines of the pencils of rays 27, 29 to the respective ray passing points 31, 33 of their principal rays 35, 37 through the vertex surface 19 along the principal ray path. FIG. 2 shows that the ray passing point 33 of the principal ray 37 through the vertex surface 19 differs from the ray passing point of that principal ray 37 through the spherical vertex surface 23, when the wearer is looking downwards. This leads to different calculated results for the focal length values depending on using the vertex surface 19 or using the spherical vertex surface 23 for the calculation. And this results in different calculated spherical and astigmatic power values for the wearer using the working lens 17. In the end the optimization of the working lens 17 is different and the optimization of the working lens 17 when using the vertex surface 19 results in a spectacle lens with smaller actual residual spherical and astigmatic errors for the wearer than the optimization according to the state of art using a spherical vertex surface which leads to a more inaccurate power calculation. With the inventive method the actual spherical and astigmatic power values of the lens fit better to the requested power distribution according to the dioptric prescription values of the wearer and the target design requests.

Although, the normal directions of the toroidal vertex surface 19 shown in FIG. 2 represent the viewing directions more accurate than the normal directions of spherical vertex surface 23 used in the state of the art the accuracy can be improved further when not only skew rotation axes are taken into account but also a small angle of the visual axis with respect to the horizontal line when the eye 1 is in its primary position. Such an angle can be taken into account by tilting the toroidal surface. Moreover, tilting the toroidal surface can also take into account that the straight continuation of the visual axis before the eye in direction towards the retina may neither intersect the horizontal rotation axis 7 nor the vertical rotation axis 9.

Figure 3:
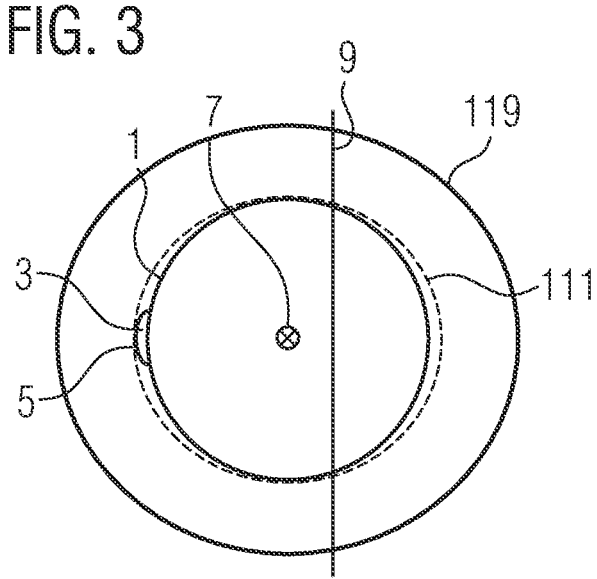
FIG. 3 shows a vertical section through an eye and an alternative vertex surface that may be used in the optimization process for optimizing the working spectacle lens.

In the exemplary embodiment, the apex surface is a toroidal apex surface. However, in other embodiments of the present disclosure, the apex surface may be an ellipsoid 111, as it is shown in FIG. 3. One then arrives at an ellipsoidal vertex surface 119 by adding, at each point of the apex surface 111, the vertex distance in normal direction of the respective point.

Furthermore, if the viewing direction is not perpendicular to the apex surface of the eye but has in the primary direction of the eye a defined azimuth angle and a defined non-zero polar angle with respect to the normal direction of the apex surface, the ray passing points—and thus the vertex surface—may be determined by adding the vertex distance vd in a direction which is given by the azimuth angle and the non-zero polar angle. By this measure, a more complex vertex surface can be computed that is formed by points having a distance according to the vertex distance from the points of the apex surface in directions that have the defined azimuth angle and the defined non-zero polar angle.

Figure 4:
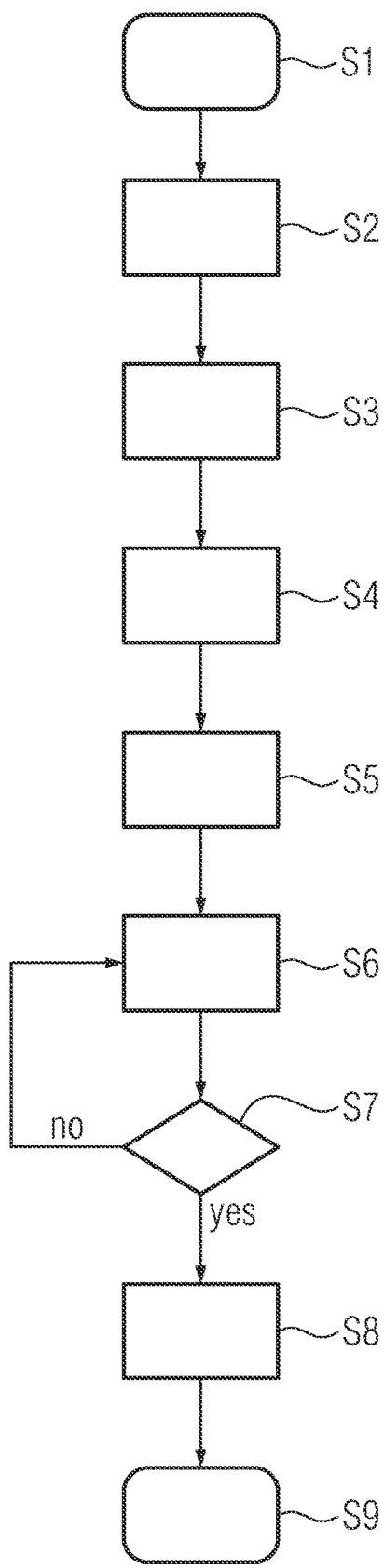
FIG. 4 shows a flow chart representing the steps executed for determining a numerical representation of a spectacle lens.

An exemplary embodiment of the computer implemented method of determining a numerical representation of a spectacle lens is shown in FIG. 4 in form of a flow chart. The method may be performed by a multipurpose data processing system such as a PC, a Notebook, a Tablet, or the like, or on a specifically dedicated data processing system. The data processing system may be adapted to perform the inventive method my means of a computer program comprising program code with instructions which, when executed on the data processing system, cause the data processing system to perform the inventive method. The computer program may be loaded into a data processing system by means of a non-volatile computer readable storage medium with the program code of the computer program stored thereon, or it may be loaded into the data processing system from a network such as, for example the internet or from a local area network.

After the method has been started in step S1 prescription data is loaded in step S2. The prescription data indicate the power values to be achieved by the numerical representation of a spectacle lens that is the result of optimizing the working spectacle lens. The numerical representation of a spectacle lens can then be used in a CNC-process for manufacturing a physical spectacle lens which achieves the established power. The power indicated by the prescription data may include spherical power, astigmatic power, prism, or any other optical characteristics of a spectacle lens.

Next, a target design for the numerical representation of the spectacle lens is loaded (step S3). In the present exemplary embodiment the target design is an optical target design and defines a distribution or specification of residual errors over the spectacle lens in the beam path of the wearer like, for example, a residual spherical error, a residual astigmatic error, a residual prismatic error, distortion errors, magnification values, residual errors of higher order, etc. Typically the residual error is defined for a number of points on a surface of the numerical representation of the spectacle lens at which the principal rays of pencils of rays pass the surface. The pencils of rays may be identical to the pencils of rays for which the back focal length will be determined in the optimization process. Additionally, targets for the refractive index or the refractive index distribution may be loaded.

In step S4 data relating to the as-worn position of the spectacle lens are loaded. The as-worn position determines the position and orientation of the spectacle lens relative to the eyes and face of the wearer. It includes at least values for the back vertex distance, the face form angle and the as-worn pantoscopic angle and may also include the object distances that may depend on the viewing angle of the eye and furthermore may include the pupil size of the eye that defines the diameter of the pencils of ray for calculation of the optical power of the pencils of rays. Additionally thickness requests for the lens and curvature requests for the surfaces of the lens (for example base curve requests for the front surface) may be loaded.

At least one of the prescription data, the target design and the data representing the as-worn position may be loaded into the computer from a non-volatile storage medium or from a network, e.g. from the internet or a local area network (LAN). Alternatively, at least one of the prescription data, the target design and the data representing the as-worn position may be input into the data processing system by means of a human machine interface such as a keyboard, a touchpad, a speech recognition system, or the like.

Although the prescription data, the target design and the data representing the as-worn position are successively loaded in a particular order in the present exemplary embodiment, any other order would also be possible. In addition, it would also be possible to load two or all of the prescription data, the target design and the data representing the as-worn position in parallel.

After the prescription data, the target design and the data relating to the as-worn position have been loaded into the data processing system a starting numerical representation of a working spectacle lens 17 is provided in step S5. For providing the starting numerical representation of the working spectacle lens 17 the computer program may select a suitable starting numerical representation of the working spectacle lens from a repository containing a number of different starting numerical representations of working spectacle lenses which differ from each other, for example, in their base curves, in the material they are made of, in their dimensions, in their dioptric power values, etc. As an alternative to retrieving the starting numerical representation of the working spectacle lens from a repository it is possible that the starting numerical representation of the working spectacle lens is loaded from a storage medium or received through a network.

In the present embodiment the starting numerical representation of the working spectacle lens 17 includes a rear surface 21 which is given by a number of parameterized piecewise defined continuous functions as they have been described above. Hence, it is the rear surface 21 which will be optimized in the present exemplary embodiment. However, optimizing the front surface, optimizing both, the rear surface and the front surface, or optimizing the refractive index distribution of the lens material would also be possible. Therefore, it is possible that in addition to the rear surface or as an alternative to the rear surface the front surface is represented numerically by a number of piecewise defined functions.

In steps S6 and S7, starting from the starting numerical representation of the working spectacle lens 17 the numerical representation of the working spectacle lens 17 is optimized by iteratively optimizing the parameters of the piecewise defined functions. Instead or additionally, the parameters of a refractive index distribution function of the lens material may be optimized. The optimization is done in step S6 by use of a ray tracing process in which the actual back focal lengths for all pencils of rays 27, 29 are calculated based on the curvatures of the front surface 25 of the numerical representation of the working spectacle lens 17, on the current curvature values of the rear surface 21 of the numerical representation of the working spectacle lens 17 as defined by the current set of the parameters of the piecewise defined functions, on the physical properties of the glass material represented by the numerical representation of the working spectacle lens 17 and on the target object distances depending on the viewing direction of the eye 1 and being based on the as-worn position of the lens before the eye 1 and the pupil diameter of the eye 1. In doing so, the position of the spectacle lens before the eye 1 and optionally the pupil diameter of the eye 1 according to the as-worn position loaded in step S4 is taken into account. Then for each pencil of rays 27, 29 the target focal length values are calculated from the prescription data, the target design data and from the target object distances depending on the viewing direction of the eye 1 or depending on the position of the point where the principal ray passes the front surface or the rear surface of the spectacle lens.

From the differences of the actual focal length values from the target focal length values the deviations from the target design can be calculated for all pencil of rays 27, 29, i.e. the spherical, astigmatic and prismatic deviations and distortion or magnification deviation from the target design can be determined. These deviations will be weighted and summed in a global merit function. Additionally, this merit function may include non-optical deviations from target values, for example deviations from wanted curvatures of the surface or from thickness requests. Furthermore the merit function may include deviations from the refractive index targets and/or deviations from the refractive index derivative targets for the lens material. Then, a value of the merit function is calculated where the value of the merit function depends on the determined deviations.

After, in step S6, the value of the merit function has been calculated it is checked in step S7 whether the calculated value represents a minimum. In case of no, the method returns to step S6 in which at least one parameter of the parameterized piecewise defined functions or at least one parameter of the refractive index distribution function is varied and the vertex distances, the deviations and the value of the merit function are recalculated. Once it is determined in step S7 that a minimum is reached the method does not return to step S6 but proceeds to step S8 in which the optimized numerical representation of the working spectacle lens, i.e. the numerical representation with the optimized rear surface and/or the optimized front surface and/or the optimized refractive index distribution, is output as the numerical representation of the spectacle lens which was to be determined. Outputting the optimized numerical representation of the spectacle lens can be done, e.g., by sending it over a network to a receiving party or by storing it on a non-volatile computer readable storage medium. Then the method ends (step S9) and the resulting numerical representation of a spectacle lens can be used for machining a lens blank or any other piece of optical material based on the numerical representation so as to form a spectacle lens with a surface as defined by the numerical representation of the spectacle lens.

In the present exemplary embodiment of the inventive method, the calculations and determinations of the optimization process are iteratively repeated until the value of the merit function has reached a minimum. Instead ending the iterations when the value of the merit function reaches a minimum the iterations may be ended when the value of the merit function does not exceed a given threshold anymore.

During the optimization process the viewing directions of the eye 1 at the ray passing points 31, 33 are represented by the normal directions of the apex surface 11 and thus of the normal direction of vertex surface 19 at the ray passing points 31, 33, or by directions given by a defined azimuth angle and a defined non-zero polar angle with respect to the normal directions of the apex surface 11 at the locations of the apex surface 19 which were used for determining the three-dimensional location of the respective ray passing points 31, 33.

The locations of the ray passing points 31, 33 may, for example, be identified by coordinates on the vertex surface 19. These coordinates may be given, for example, in form of a first angle measured between the principal ray 35, 37 of a pencil of rays 27, 29 and the primary direction within a vertical plane including the primary direction and a second angle measured between the principal ray 35, 37 of the pencil of rays 27, 29 and the primary direction within a horizontal plane including the primary direction. However, other coordinates on the vertex surface may be used, for example, the angles of spherical coordinates or three-dimensional coordinates of the surface points based on a Cartesian coordinate system. In the present exemplary embodiment the principal rays 35, 37 used in the ray tracing process represent a viewing direction that corresponds to the normal direction at the ray passing point 31, 33 of the vertex surface 19. Alternatively the principal rays 35, 37 may represent a viewing direction with a defined azimuth angle and a defined non-zero polar angle with respect to the normal direction of the apex surface 19 at the point of the apex surface 11 which was used for determining the three-dimensional location of the respective ray passing point 31, 33. This leads to a ray path through specified optimization points on the front surface or a ray path to a specified point in the object space. Then for the pencils of rays with these paths of the principal rays the optical properties of the lens are optimized.

In the following, specific examples of spectacle lenses optimized according to the inventive method are compared to spectacle lenses optimized according to the state of the art.

Figure 5:
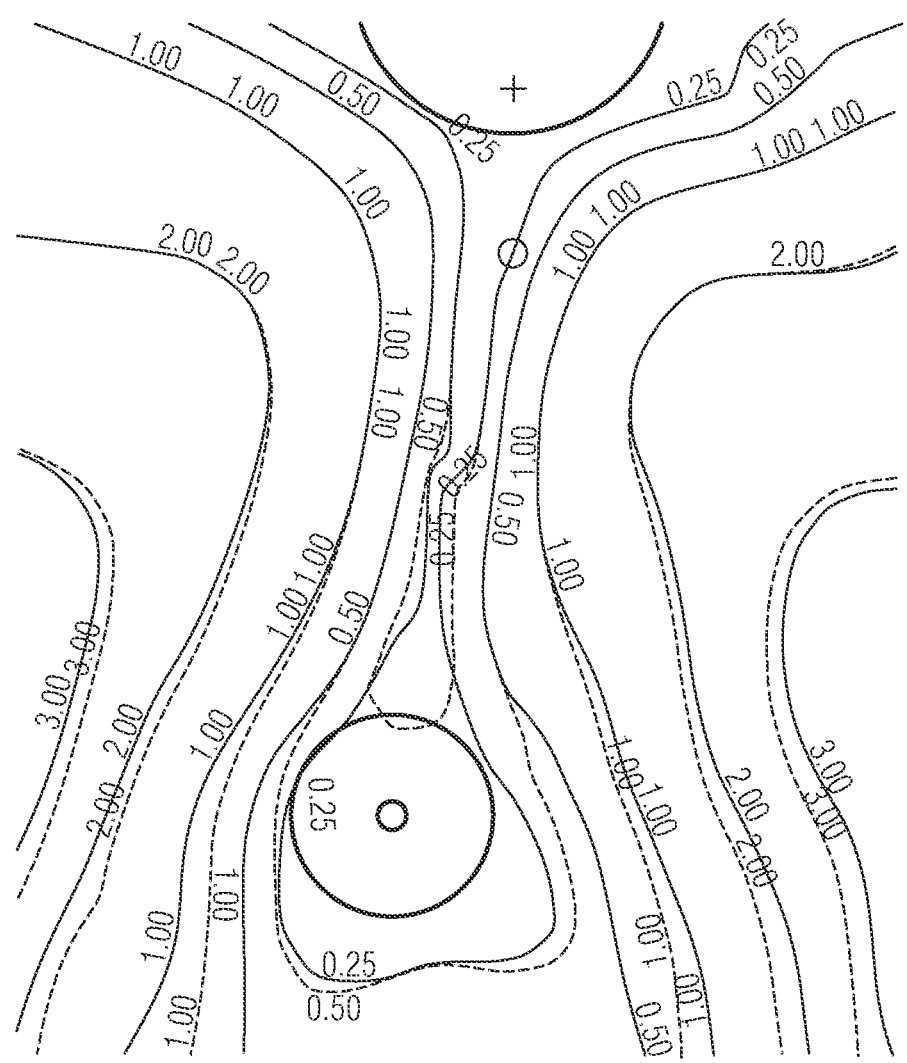
FIG. 5 shows a distribution of the residual astigmatic error for a progressive addition lens (PAL) which has been optimized by use of a state of the art process together with the distribution of the residual astigmatic error calculated using a horizontal rotation axis and a vertical rotation axis which do not intersect.

FIG. 5 shows the distribution of the residual astigmatic error of a progressive addition lens which has been optimized by use of a state of the art method. While the solid lines show the distribution of the residual astigmatic error of the lens optimized for an eye with a single pivot point the dotted lines show a recalculated distribution of the residual astigmatic error where, in the recalculation, a ray tracing is performed for the optimized spectacle lens considering a non-zero distance between the horizontal rotation axis and the vertical rotation axis.

The spectacle lens shown in FIG. 5 is a progressive addition lens with a sphere of 4.00 diopter, a cylinder of 0 diopter, and an addition of 2.50 diopter with the progressive surface being the rear surface. The front surface is spherical with a radius of 77.34 mm. The glass material of the spectacle lens has a refractive index of 1.600. The vertex distance is 9 mm, the face form angle is 2 degree and the as-worn pantoscopic angle is 9 degree. The distance of the fitting cross to the tangent at the lower extremity of the lens shape is 21.0 mm, the distance of the fitting cross to the tangent at the upper extremity of the lens shape is 11.5 mm, the distance of the fitting cross to the tangent at the nasal extremity of the lens shape is 23.0 mm, and the distance of the fitting cross to the tangent at the temporal extremity of the lens shape is 28.5 mm. According to the prescription, a mean spherical power of 6.50 diopter (4.00 diopter plus addition of 2.50 diopter) shall be achieved at the near reference point, and the target design specifies a residual astigmatic error at the near reference point of 0.14 diopter. However, in order to achieve a mean spherical power of 6.50 diopter over a larger area of the near vision zone a slightly higher mean spherical power at the near reference point is permitted. Thus, the optimized mean spherical power at the near reference point is 6.56 D. For the optimization, a spherical apex surface with a radius of 12.5 mm as measured from a single pivot point of the eye is used. Together with the vertex distance of 9 mm this leads to a spherical vertex surface with a radius of 21.5 mm.

For the recalculation of the mean spherical power and the residual astigmatic error of the optimized spectacle lens a distance of the horizontal rotation axis from the apex of the cornea of 11 mm is used. The distance between the vertical rotation axis 9 and the apex 5 of the cornea 3 is set to be 14 mm. With the vertex distance of 9 mm the vertical radius of the toroidal vertex surface is 20 mm and the horizontal radius of the toroidal vertex surface is 23 mm. The distance between the horizontal rotation axis 7 and the vertical rotation axis 9 is 3 mm and the pivot point of the spherical state of the art vertex surface lies in between both rotation axis.

While the state of the art optimization process provides a mean spherical power of 6.56 diopter and a residual astigmatic error of 0.14 diopter at the near reference point the more exact calculation of the mean spherical power and the residual astigmatic error of the optimized spectacle lens with taking into account spaced apart rotation axes reveals an actual mean spherical power of 6.71 diopter and a residual astigmatic error of 0.36 diopter at the near reference point. This shows that the residual errors experienced by the wearer of a spectacle lens optimized according to the state of the art can be considerably larger than the state of the art calculation and optimization process would suggest.

Figure 6:
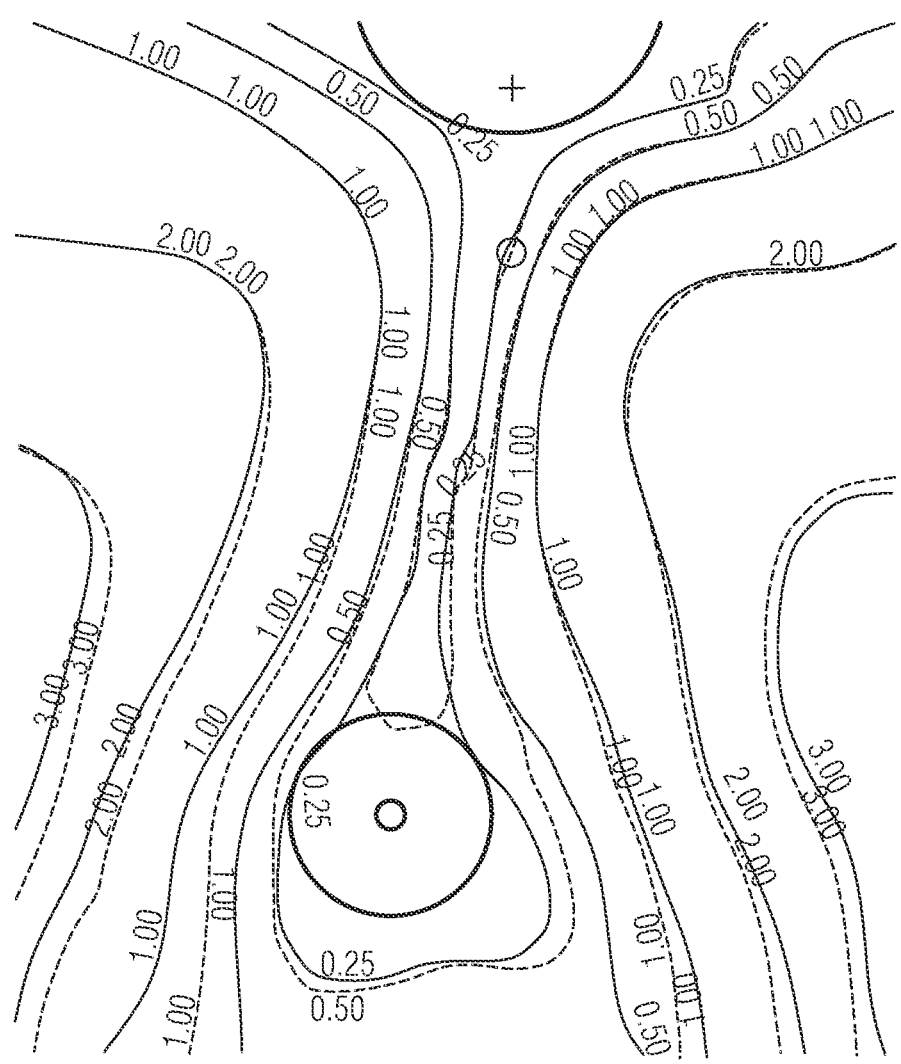
FIG. 6 shows a distribution of the residual astigmatic error for a progressive addition lens (PAL) which has been optimized taking into account a non-zero distance between the horizontal rotation axis and the vertical rotation axis together with a distribution of the astigmatic error calculated with only taking into account a single pivot point.

FIG. 6 shows the distribution of the residual astigmatic error for the same spectacle lens as before but optimized with taking into account the distance between the horizontal rotation axis and the vertical rotation axis. The solid lines represent the residual astigmatic error according to the results of the inventive optimization process while the dotted lines represent the residual astigmatic error according to the results of the state of the art optimization process as recalculated with taking into account spaced apart rotation axis. According to the inventive optimization process considering the distance between the rotation axes the mean spherical power at the near reference point is 6.57 diopter with a residual astigmatic error of 0.14 diopter. The recalculation of the residual errors obtained for a lens that is optimized with the state of the art vertex surface results in a mean spherical power of 6.71 diopter together with a residual astigmatic error of 0.36 diopter.

FIGS. 5 and 6 show that disregarding the distance between the horizontal rotation axis and the vertical rotation axis can lead to considerable deviations of the realized residual astigmatic error distribution from the desired residual astigmatic error distribution, respectively, in particular in the near viewing zone. Likewise, disregarding the distance between the horizontal and the vertical rotation axis leads to considerable deviations of the realized distribution of mean spherical power to the desired distribution of the mean spherical power.

Figure 7:
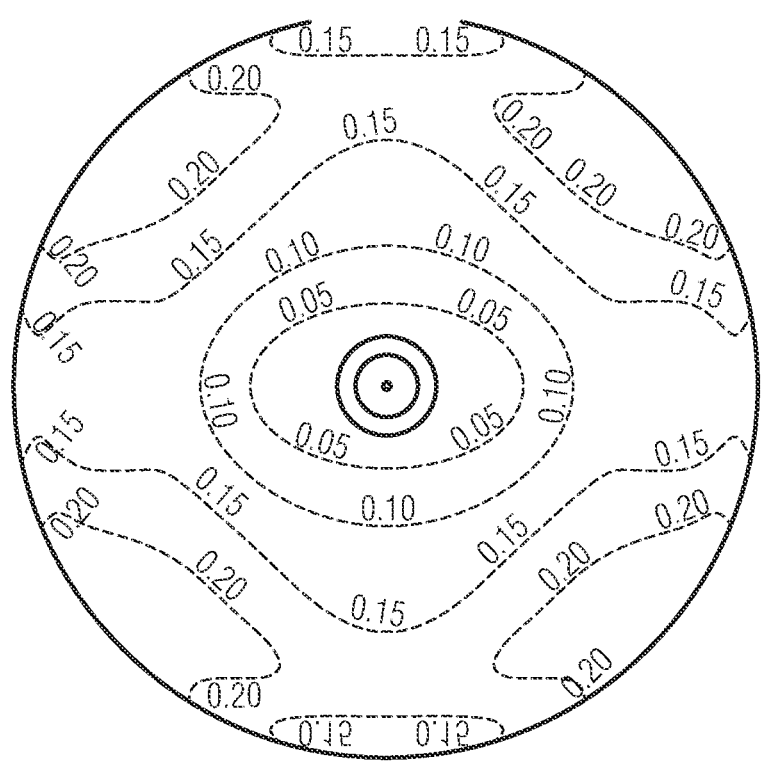
FIG. 7 shows the residual astigmatic error for a single vision lens that has been optimized by use of a state of the art process.
Figure 8:
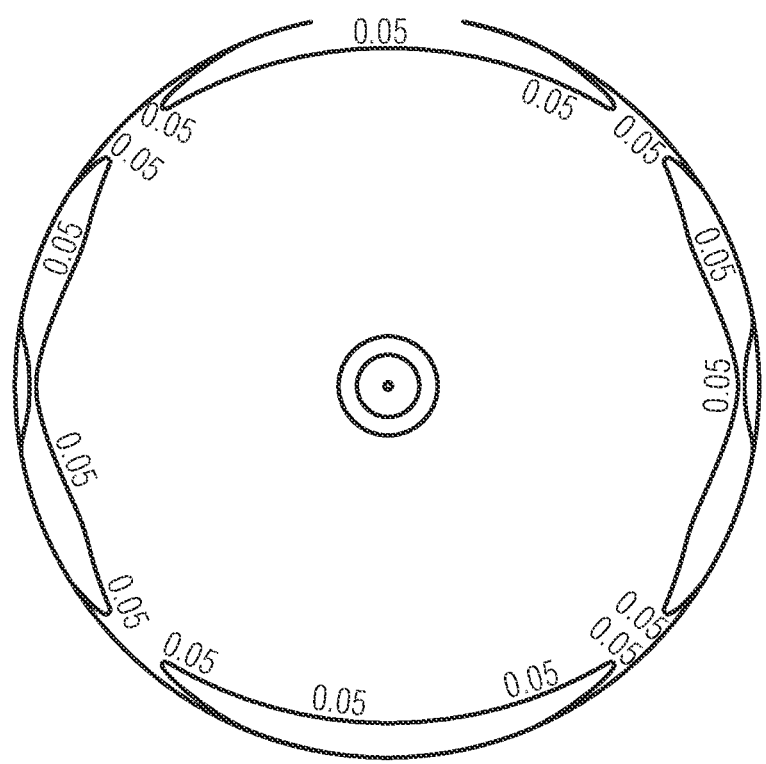
FIG. 8 shows the residual astigmatic error distribution for a single vision lens which has been optimized taking into account a non-zero distance between the horizontal rotation axis and the vertical rotation axis.

FIGS. 7 and 8 show a comparison of a single vision spectacle lens optimized according to the state of the art (FIG. 7) and optimized according to the inventive method (FIG. 8). The single vision spectacle lens has a spherical power of 4.00 diopter and a cylindrical power of 0.00 diopter. Its front surface is spherical with a radius of 110.67 mm and its rear surface is aspherical. The refractive index of the glass material of the spectacle lens is 1.664 and the edge thickness of the spectacle lens for a circular rim with a diameter of 60 mm is 0.8 mm. The spectacle lens is to be used with a vertex distance of 9.2 mm. The spectacle lens is fitted according to the conventional center of rotation requirement with the optical axis of the lens in the geometrical center of the lens.

In the spectacle lens shown in FIG. 7 the aspherical rear surface of the spectacle lens was optimized according to the state of the art method, i.e. using a spherical vertex surface centered at a single pivot point and the optical axis of the lens goes through this single pivot point. The target for the astigmatic error given by the target design was zero over the whole lens, and with the state of the art optimization of the aspheric rear surface of the spectacle lens with a residual astigmatic error distribution that is smaller than 0.03 diopter for all viewing directions of the eye if the eye has only one pivot point was achieved. That means that the wearer has nearly no astigmatic error when viewing through any part of the whole lens if the eye has a single pivot point. In other words, for the eye with a single pivot point the target of nearly no astigmatism was achieved. In the optimization, a distance between the pivot point and the rear surface of the spectacle lens of 21.7 mm was used. As can be seen from FIG. 7, the distribution of the residual astigmatic error does not show rotational symmetry when the distribution of the residual astigmatic error is recalculated with a distance of 3 mm being present between the horizontal rotation axis and the vertical rotation axis of the eye and with the optical axis of the spectacle lens going through the horizontal and vertical rotation axis of the eye. Furthermore, the residual astigmatic error of the recalculation exceeds 0.03 D and reaches values above 0.15 D in the periphery of the spectacle lens. In other words, the residual astigmatic error increases noticeable when the wearer looks through the peripheral parts of the lens. If, however, for the optimization the distance of the horizontal rotation axis, i.e. the rotation axis about which the eye rotates when changing the vertical viewing direction, to the rear surface of the spectacle lens is set to 20.2 mm and the distance of the vertical rotation axis, i.e. the rotation axis about which the eye rotates when changing its horizontal viewing direction, to the rear surface of the spectacle lens is set to 23.2 mm and the optical axis of the lens goes through the horizontal and the vertical axis of the eye, then the residual astigmatic error of the spectacle lens after the inventive optimization taking into account of the corresponding toroidal vertex surface does not exceed 0.05 diopter except for the outermost peripheral parts of the spectacle lens, as can be seen from FIG. 8. Moreover, the distribution of the astigmatic error over the area of the spectacle lens achieved with the optimization process according to the disclosure shows a much higher degree of rotational symmetry than the distribution achieved with the state of the art optimization process, as can be seen from comparing FIGS. 7 and 8. Hence, by taking into account a distance between the horizontal rotation axis and the vertical rotation axis when optimizing the single vision spectacle lens, not only the residual astigmatic error can be reduced but also the symmetry of the distribution of the residual astigmatic error can be improved.

The residual astigmatic error can be further reduced if instead of an aspherical surface a freeform surface which shows axial symmetry about a horizontal axis and a vertical axis is optimized. This means that a single vision spectacle lens for a purely spherical prescription would not show rotational symmetry anymore if the lens is optimized for an eye with a non-zero distance between the horizontal and the vertical rotation axis of the eye. Instead it would show axial symmetry about a horizontal axis and about a vertical axis. This is particularly true for a single vision spectacle lens for a pure spherical prescription that is fitted according to the conventional center of rotation requirement.

The present disclosure has been described for illustration purposes by means of exemplary embodiments thereof. However, deviations from the exemplary embodiments are possible. For example before returning to step S6 after step S7 of FIG. 4 it may be checked whether a maximum number of iterations has been reached. In case of yes the method would end without result. In case of no a method would return to step S6. In addition, although the distance between the horizontal rotation axis and the vertical rotation axis has a value 3 mm in the exemplary embodiments this value could be different, for example 2.8 mm, 2.5 mm 3.2 mm or 3.5 mm. In particular, the value could be any value greater than 0 mm up to 7.5 mm, for example, a value out of the range between 1 and 5 mm or, more specific, out of the range between 2 mm and 4 mm. Moreover, as an alternative to the apex surfaces of the exemplary embodiments, an apex surface may be used which is derived by a measurement process. For example, the measurement process may derive the three-dimensional coordinates of the locations of the apex of the cornea for a number of rotational orientations of the eye by evaluating stereoscopic images taken with the eye in the respective orientations. Furthermore, the vertex distance may be added at a defined angle with respect to the normal direction of the apex surface. Therefore, the exemplary embodiments are not meant to restrict the scope of protection of the present disclosure. The scope of protection shall only be delimited by the appended claims.

The disclosure which has been illustrated by means of exemplary embodiments provides various advantages over the state of the art using a spherical vertex surface. The spherical vertex surface is based on the assumption that there is a single pivot point of the eye. This is, however only a crude approximation. In reality there is in general no single pivot point of the eye. In a much better approximation, the horizontal rotation axis about which the eye rotates for changing the vertical viewing direction has a distance to the vertical rotation axis about which the eye rotates for changing the horizontal viewing direction so that the horizontal rotation axis and the vertical rotation axis in general do not intersect. In addition, the straight continuation of the visual axis before the eye in direction towards the retina of the eye may have a distance to the horizontal rotation axis and/or to the vertical rotation axis. As a consequence, it may not intersect the horizontal rotation axis and/or the vertical rotation axis. Furthermore, the visual axis may run at an angle to the normal direction of the apex of the surface of the cornea. All these factors contribute to reducing the optical quality of the result of the optimization process when a spherical vertex surface is used in the optimizing process. The inventive way of constructing the vertex surface allows for taking into account some or all of these factors, thus allowing for a considerable improvement in the optical quality of the spectacle lens resulting from the optimization process.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of" The terms "a" and "the" as used herein are understood to encompass the plural as well as the singular.

All publications, patents, and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer implemented method of determining a numerical representation of a spectacle lens, the method comprising:
   optimizing a numerically represented working spectacle lens with an optimization process by iteratively optimizing parameters of piecewise defined functions, which involves ray tracing using a number of pencils of rays along different viewing directions of an eye and a merit function, to obtain an optimized numerically represented working spectacle lens which constitutes the numerical representation of the spectacle lens to be determined,
   wherein the principal rays of the pencils of rays each pass different ray passing points forming points of a vertex surface, and
   wherein the principal rays of the pencils of rays extend along viewing directions related to the respective ray passing point; and
   determining the three-dimensional locations of the ray passing points as surface points of a non-spherical apex surface representing the locations of the apex of a cornea when the eye rotates and a fixed distance which is added to the apex surface at the respective surface points in a direction that corresponds to the viewing direction of the eye when an apex of the cornea is located at the respective surface point,
   wherein the viewing direction is represented by a defined azimuth angle and a defined polar angle with respect to the normal direction of the apex surface at the surface point of the apex surface.

2. The computer implemented method of claim 1, wherein the defined azimuth angle is a constant azimuth angle and the defined polar angle is a constant polar angle or the defined azimuth angle and the defined polar angle are determined by a functional dependency of the azimuth angle and the polar angle on at least one variable.

3. The computer implemented method of claim 1, wherein the defined polar angle is an angle in a range extending from 0 degree to 20 degree.

4. The computer implemented method of claim 1, wherein the apex surface is a surface which results from the locations of the cornea when the eye rotates about a first rotation axis and about a second rotation axis which is not parallel to the first rotation axis, and
   wherein the first rotation axis and the second rotation axis do not intersect.

5. The computer implemented method of claim 4, wherein a distance between the first rotation axis and the second rotation axis is in a range from greater than 0 mm up to 7.5 mm.

6. The computer implemented method of claim 1, wherein the apex surface is a surface of an ellipsoid.

7. The computer implemented method of claim 1, wherein the apex surface is a result of a measurement.

8. The computer implemented method of claim 1, wherein the fixed distance is the vertex distance.

9. A computer program for determining a numerical representation of a spectacle lens, the computer program being stored on a non-transitory storage medium and having program code with instructions which, when executed by a computer, cause the computer to:
   optimize a numerically represented working spectacle lens with an optimization process iteratively optimizing parameters of piecewise defined functions, which involves ray tracing using a number of pencils of rays along different viewing directions of an eye and a merit function to obtain an optimized numerically represented working spectacle lens which constitutes the numerical representation of the spectacle lens to be determined,
   wherein the principal rays of the pencils of rays each pass different ray passing points forming points of a vertex surface and wherein the principal rays of the pencils of rays extend along a viewing direction related to the respective ray passing point; and
   determine the three-dimensional locations of the ray passing points by surface points of a non-spherical apex surface representing the locations of the apex of the cornea when the eye rotates and to add a fixed distance to the apex surface at the respective surface points in a direction that corresponds to the viewing direction of the eye when the apex of the cornea is located at the respective surface point,
   wherein the viewing direction is represented by a defined azimuth angle and a defined polar angle with respect to the normal direction of the apex surface at the surface point of the apex surface.

10. The computer program of claim 9, wherein the defined azimuth angle is a constant azimuth angle and the defined polar angle is a constant polar angle or the defined azimuth angle and the defined polar angle are determined by a functional dependency of the azimuth angle and the polar angle on at least one variable.

11. A non-transitory computer readable storage medium with program code stored thereon, the program code comprising instructions for determining a numerical representation of a spectacle lens, where the instructions, when executed on a computer, cause the computer to:
   optimize a numerically represented working spectacle lens with an optimization process iteratively optimizing parameters of piecewise defined functions which involves ray tracing using a number of pencils of rays along different viewing directions of an eye and a merit function to obtain an optimized numerically represented working spectacle lens which constitutes the numerical representation of the spectacle lens to be determined, wherein the principal rays of the pencils of rays each pass different ray passing points forming points of a vertex surface, wherein the principal rays of the pencils of rays extend along a viewing direction related to the respective ray passing point; and determine the three-dimensional locations of the ray passing points by surface points of a non-spherical apex surface representing the locations of the apex of the cornea when the eye rotates and to add a fixed distance to the apex surface at the respective surface points in a direction that corresponds to the viewing direction of the eye when the apex of the cornea is located at the respective surface point, and wherein the viewing direction is represented by a defined azimuth angle and a defined polar angle with respect to the normal direction of the apex surface at the surface point of the apex surface.

12. The non-transitory computer readable storage medium of claim 11, wherein the defined azimuth angle is a constant azimuth angle and the defined polar angle is a constant polar angle or the defined azimuth angle and the defined polar angle are determined by a functional dependency of the azimuth angle and the polar angle on at least one variable.

13. A data processing system for determining a numerical representation of a spectacle lens, the data processing system comprising:

a processor and;

at least one memory wherein, based on instructions of a computer program stored in the memory, the processor is configured to:

optimize a numerically represented working spectacle lens with an optimization process iteratively optimizing parameters of piecewise defined functions, which involves ray tracing using a number of pencils of rays along different viewing directions of an eye and a merit function, to obtain an optimized numerically represented working spectacle lens which constitutes the numerical representation of the spectacle lens to be determined, wherein the principal rays of the pencils of rays each pass different ray passing points forming points of a vertex surface, and wherein the principal rays of the pencils of rays extend along a viewing direction related to the respective ray passing point; and determine the three-dimensional locations of the ray passing points by surface points of a non-spherical apex surface representing the locations of the apex of the cornea when the eye rotates and to add a fixed distance to the apex surface at the respective surface points in a direction that corresponds to the viewing direction of the eye when the apex of the cornea is located at the respective surface point, wherein the viewing direction is represented by a defined azimuth angle and a defined polar angle with respect to the normal direction of the apex surface at the surface point of the apex surface.

14. The data processing system of claim 13, wherein the defined azimuth angle is a constant azimuth angle and the defined polar angle is a constant polar angle or the defined azimuth angle and the defined polar angle are determined by a functional dependency of the azimuth angle and the polar angle on at least one variable.

15. The computer implemented method of claim 1, wherein the method includes a step of outputting the optimized numerical representation of the spectacle lens by sending the optimized numerical representation over a network to a receiving party or by storing the optimized numerical representation on a non-transitory computer readable storage medium.

16. A method of manufacturing a spectacle lens in which a piece of optical material is machined based on a numerical representation of a spectacle lens so as to form a spectacle lens with a surface as defined by the numerical representation of the spectacle lens wherein the method includes determining the numerical representation of the spectacle lens according to the computer implemented method as claimed in claim 1.

\* \* \* \* \*